(12) United States Patent
Furman et al.

(10) Patent No.: US 8,415,491 B2
(45) Date of Patent: Apr. 9, 2013

(54) SURFACE TREATMENT AND EXCHANGE OF NANOSTRUCTURES FROM AQUEOUS SUSPENSION INTO ORGANIC MEDIA AND INTO POLYMER-MATRIX COMPOSITES

(75) Inventors: Benjamin R. Furman, San Antonio, TX (US); Stephen T. Wellinghoff, San Antonio, TX (US); Michael J. Rubal, Lytle, TX (US)

(73) Assignee: Southwest Research Institute, San Antonio, TX (US)

( * ) Notice: Subject to any disclaimer, the term of this patent is extended or adjusted under 35 U.S.C. 154(b) by 363 days.

(21) Appl. No.: 12/960,195

(22) Filed: Dec. 3, 2010

(65) Prior Publication Data

US 2012/0142954 A1 Jun. 7, 2012

(51) Int. Cl.
C07F 15/00 (2006.01)
C07F 13/00 (2006.01)
C07F 9/00 (2006.01)
C07F 7/00 (2006.01)
C07F 1/00 (2006.01)

(52) U.S. Cl. .......................... 556/12; 977/896; 562/115
(58) Field of Classification Search .................. 210/511, 210/634; 977/896; 562/115; 558/87; 556/12, 556/19, 27, 42, 47, 51, 57, 110, 118, 138
See application file for complete search history.

(56) References Cited

U.S. PATENT DOCUMENTS

| | | | |
|---|---|---|---|
| 4,816,594 | A | 3/1989 | Wengong et al. |
| 5,468,791 | A | 11/1995 | Yuan |
| 6,194,481 | B1 | 2/2001 | Furman et al. |
| 6,860,924 | B2 | 3/2005 | Rajagopalan et al. |
| 2009/0257968 | A1 | 10/2009 | Walton et al. |
| 2009/0281224 | A1 | 11/2009 | Koh et al. |

OTHER PUBLICATIONS

Van ES, et al., "Comparing Polymer-Clay Nanocomposites with Conventional Composites using Composite Modeling," Specialty Polymer Additives, Oxford: Blackwell Science, 2001, pp. 391-413.
Moloney, et al., "Review Parameter determining the strength and toughness of particulate filed epoxide resins," Journal of Materials Science 22 (1987) 381-393.
Shen, et al., "Effects of two damage mechanisms on effective elastic properties of particulate composites," Composites Science and Technology. 2002;62(10-11):1397-1406.
Davidson, et al., "Mineral liquid crystals," Current Opinion in Colloid and Interface Science, 9 (2005) 377-383.
Mourad, et al., "Formation of Nematic Liquid Crystals of Sterically Stabilized Layered Double Hydroxide Platelets," J. Phys. Chem. B 2008, 112, 10142-10152.
Van Der Beek, et al., "Evidence of the Hexagonal columnar liquid-crystal phase of hard colloidal platelets by high-resolution SAXS," The European Physical Journal E: Soft Matter and Biological Physics (2005) vol. 16, No. 3, 253-258.
Van Der Kooiji, et al., "Liquid Crystal Phase transitions in suspensions of polydisperse plate-like particles," Nature, vol. 46, Aug. 24, 2000, pp. 866-871.

(Continued)

*Primary Examiner* — Porfirio Nazario Gonzalez
(74) *Attorney, Agent, or Firm* — Grossman, Tucker et al

(57) ABSTRACT

The present invention is directed to a method of exchanging nanostructures from within aqueous liquid media into organic liquid media. The steps comprise first supplying solid nanostructures in an aqueous liquid media, adjusting the pH, incorporating an ionic surfactant sufficient to reduce nanostructure aggregation, followed by concentrating the nanostructures in the aqueous liquid media. The nanostructures may them be placed in organic liquid media followed by introduction of a coupling agent capable of covalent attachment to the nanostructure surface while providing a functional group capable of polymerization to covalently bond the nanostructures to a selected monomer and/or polymer resin.

21 Claims, 2 Drawing Sheets

OTHER PUBLICATIONS

Van Der Kooiji, et al., "Formation of Nematic Liquid Crystals in Suspensions of Hard Colloidal Platelets," J. Phys. Chem. B 1998, 102, 7829-7832.

Wierenga, et al., "Aqueous dispersions of colloid gibbsite platelets: synthesis, characterisation and intrinsic viscosity measurements," vol. 134, Issue 3, Mar. 31, 1998, pp. 359-371.

Gan, et al., "Charging Behavior of the Gibbsite Basal (001) Surface in NaCl Solution Investigated by AFM Colloidal Probe Technique," Langmuir 2006, 22, 6087-6092.

Bickmore, et al., "Bond-Valence methods for pKa prediction: critical reanalysis and a new approach," Geochimica et Cosmochimica Acta, vol. 68, Issue 9, May 1, 2004, pp. 2025-2042.

Taviot-Gueho, et al., "In Situ Polymerization and Intercalation of Polymers in Layered Double Hydroxides," Struct Bond (2006) 119: 121-159.

Bubniak, et al., "Preparations of New Nanocomposite of A10.33Mg0.67(OH)2(C12H25SO4)0.33 and Poly(ethhylne oxide)," Langmuir 2002, vol. 18, No. 16, 5967-5970.

Vielle, et al., "In Situ polymerization of interleaved monomers: a comparative study between hydrotalcite and hydrocalumite host structures," Journal of Physics and Chemistry of Solids, vol. 65, Issues 2-3, Mar. 2004, pp. 385-393.

Moujahid, et al., "Poly(styrene sulfonate) layered double hydroxide nanocomposites. Stability and subsequent structural transformation with changes in temperature," J. Mater. Chem., 2003, 13, 258-264 Journal of Materials Chemistry (2003), 13, 258-264.

Moujahid, et al., "Synthesis and characterization of a polystyrene sulfonate layered double hydroxide nanocompsoite. In-situ polymerization v. polymer incorporation," J. Mater. Chem. (2002), 12, 3324-3330.

Lin, et al., "Electrophoretic deposition of biomimetic nanocomposites," Electrochemistry Communications vol. 11, Issue 8, Aug. 2009, pp. 1635-1638.

Lin, et al., "Bioinspired Assembly of Colloidal Nanoplatelets by Electric Field," Chem. Mater., 2009, 21 (10), pp. 2039-2044.

Wellinghoff, et al., "Advanced Dental Restorative Composites Utilizing Low Polymerization Shrinkage Liquid Crystalline Monomers," Physical Chemistry 2006, H-3-SL, pp. 479-485.

Wang, et al., "Influence of nano-LDHs on char formation and fire-resistant properties of flame-retardant coating," Progress in Organic Coatings 53 (2005) 29-37.

Halpin, et al., "Effects on Environmental Factors on Composite Materials," AFML TR, 67 (1969), available online at http://www.dtic.mil/cgi-bin/GetTRDoc?Location=U2&doc=GetTRDoc.pdf&AD=ADA306357; retrieved on Feb. 1, 2011.

Fornes, et al., "Modeling properties of nylon 6/clay nanocomposites using composite theories," Polymer 44 (2003) 4993-5013.

Spanoudakis, et al., "Crack propagation in a glass particle-filled epoxy resin. Part 1 Effect of particle volume fraction and size," Journal of Materials Science 19 (1984) 473-486.

Wijnhoven, et al., "Sedimentation and Phase Transitions of Colloidal Gibbsite Platelets," Langmuir 2005, 21, 10422-10427.

US 8,415,491 B2

SURFACE TREATMENT AND EXCHANGE OF NANOSTRUCTURES FROM AQUEOUS SUSPENSION INTO ORGANIC MEDIA AND INTO POLYMER-MATRIX COMPOSITES

STATEMENT REGARDING FEDERALLY SPONSORED RESEARCH OR DEVELOPMENT

This invention was made with government support under contract number DE018370 awarded by the National Institutes of Health. The government has certain rights in the invention.

FIELD OF THE INVENTION

The present invention is directed to the formation of nanostructures dispersed within a polymer matrix. As solid nanostructures are typically suspended in an aqueous liquid media at level of 0.1-50.0% by volume, as a consequence of the production of such nanostructures within an aqueous phase and/or due to the beneficial stabilization associated with the use of an aqueous environment, the present invention provides a relatively more direct route to nanostructure incorporation into monomer and/or polymer media for a variety of applications. The nanostructures may be initially provided in aqueous environments and then exchanged into organic media utilizing ionic surfactants followed by exposure to a coupling agent that contains polymerizable functionality. The nanostructures may then be covalently bonded to a polymer resin network.

BACKGROUND

Various problems remain with respect to the preparation of resin-based nanocomposite material. Typically, nanostructures, such as nanoparticles, are prepared in an aqueous solution or otherwise stabilized in an aqueous environment to prevent aggregation. The exchange of the nanoparticles from the aqueous environment into a more hydrophobic resin matrix typically requires a multi-step surface treatment. The present disclosure is directed at an improved method for exchange of nanoparticles from an aqueous environment into organic environments and eventual dispersion into organic monomer or polymer media.

SUMMARY

A method is described for exchanging nanostructures from within aqueous liquid media into organic liquid media which may contain organic soluble monomers or polymers. Nanostructures are first suspended in an aqueous liquid media and the pH of the aqueous liquid media is adjusted to provide a net ionic charge on a surface of the nanostructures. This may then be followed by incorporating an ionic surfactant into the said aqueous liquid media wherein the level of ionic surfactant is sufficient to reduce the nanostructure's irreversible aggregation, and is followed by concentrating the nanostructures in the aqueous liquid media. At this point one may introduce organic liquid media to the concentrated nanostructures, thus redispersing the nanostructure in an organic liquid phase separated from the aqueous phase. A coupling agent can be introduced into the organic phase that is capable of covalent attachment to the nanostructure surface while providing a functional group capable of polymerization to covalently bond the nanostructures to a selected monomer and/or polymer resin.

BRIEF DESCRIPTION OF THE DRAWINGS

The detailed description below may be better understood with reference to the accompanying figures which are provided for illustrative purposes and are not to be considered as limiting any aspect of the invention.

DETAILED DESCRIPTION

Figure 1:
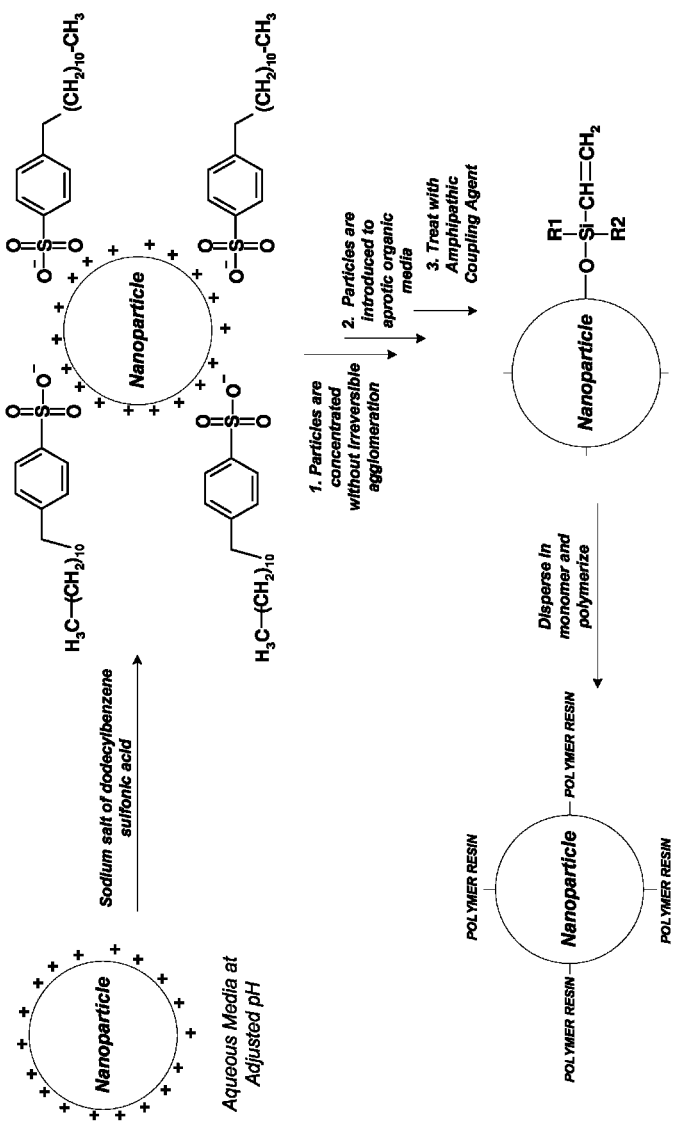
FIG. 1 illustrates pH adjustment to provide nanostructures with positive surface charge, surfactant association to prevent agglomeration, exchange into organic media, treatment with coupling agent and dispersion in a polymer network.

The present invention is generally directed to the exchange of nanostructures from aqueous media into organic media followed by dispersion into organic monomer and/or polymer media. As solid nanostructures are typically suspended in an aqueous liquid media at level of 0.1-50.0% by volume, as a consequence of the production of such nanostructures within an aqueous phase and/or due to the beneficial stabilization associated with the use of an aqueous environment, the present invention provides a relatively more direct route to nanostructure incorporation into monomer and/or polymer media for a variety of applications.

The dispersion of the nanostructures in the initial aqueous media may now be specifically facilitated by the use of ionic surfactants which reduce and/or prevent irreversible nanostructure aggregation. The individual nanostructures are then allowed to concentrate or flocculate within the aqueous media and are conveniently isolated followed by exchange into organic media where they may be further exposed to a selected coupling agent. The coupling agent may then covalently bond to the surface of the nanostructures while also supplying polymerization functionality for reaction with a selected monomer and ultimate covalent attachment to a desired polymer resin.

Reference to nanostructures herein may be understood as any solid (e.g., particles, rod, tubes and/or platelets) having at least one dimension of 1-999 nm, including all values therein, in 1.0 nm increments. For example, the nanoparticles utilized herein may specifically comprise those particles having diameters of 1 nm, 2 nm, 3 nm, etc., up to 999 nm. With respect to the above referenced nanotube and/or nanorod type structures, such may now be understood as any tubular or rod type geometry that similarly has at least one nanometer dimension in the range of 1 nm to 999 nm, including all values therein, in 1.0 nm increments. Therefore it may be appreciated that other dimensions of the nanostructures disclosed herein may exceed nanometer dimensions (e.g. the nanotube and/or nanorod length) and achieve levels of up to and including 10 microns.

The nanostructures may also be in the form of nanoplatelets with an aspect ratio (l/d) greater than or equal to 3.0, and wherein the platelets also have one dimension (e.g. thickness) in the range of 1-999 nm. The term "aspect ratio" is another defining feature of platelet particles. Aspect ratio is the minimum width of a platelet particle divided by its thickness. As noted, the platelets may therefore have a thickness of 1-999 nm, but other dimensions of the platelets may be much larger and up to 10 microns.

The nanostructures herein may preferably be inorganic based, and may include metal oxides. For example, the metal oxides may include those selected from the group consisting of MgO, SrO, BaO, CaO, $ZrO_2$, FeO, $V_2O_3$, $V_2O_5$, $Mn_2O_3$, $Fe_2O_3$, NiO, CuO, $Al_2O_3$, ZnO, $Ag_2O$, $TiO_2$, $ZrO_2$, $HfO_2$, $WO_2$, corresponding hydroxides of the foregoing, and mixtures thereof.

The nanostructure composition may also preferably include layered double hydroxide (LDH) materials. Such materials may be understood as a class of compounds which consist of sheets of the hydroxides of two or more metals of different valence. The metal hydroxide layers are positively charged, so charge neutrality requires that charge balancing or "guest" anions must be intercalated between the layers. Water is also usually present, hydrogen-bonded both to the hydroxyl ions of the metal hydroxide layers and to the intercalated guest anions.

LDHs are often referred to as hydrotalcite-type minerals and commonly represented by the formula $[M^{z+}_{1-x}M^{3+}_x(OH)_2]^{q+}(X^{n-})_{q/n}\cdot yH_2O]$. Most commonly, z=2, and $M^{2+}=Ca^{2+}$, $Mg^{2+}$, $Mn^{2+}$, $Fe^{2+}$, $Co^{2+}$, $Ni^{2+}$, $Cu^{2+}$ or $Zn^{2+}$; hence q=x. Pure phases have been shown to exist over the range $0.2 \leq x \leq 0.33$. However, values of x have been reported in the range $0.1 \leq x \leq 0.5$. Also possible is z=1, where $M^+ = Li^+$ and $M^{3+}=Al^{3+}$. In this case q=2x–1. The latter family of materials can be described by the formula $[LiAl_2(OH)_6]X\cdot yH_2O$ ($LiAl_2$—X)). X represents a generic interlayer anion and the value of y is normally found to be between 0.5-4. LDHs may be formed with a wide variety of interlayer anions X (e.g. OH, Cl, Br, and $NO_3$).

The nanostructure composition may also include metal phosphates and phosphonates, such as calcium phosphate, calcium phosphonates, magnesium phosphate, magnesium phosphonates, zirconium phosphate, zirconium phosphonates, titanium phosphate and titanium phosphonate, silicates and metal oxides. Preferred compositions are hydrotalcites, calcium phosphates such as apatite and brushite, zirconium phosphonates, and zirconium oxides. The nanostructure composition may also include spinels, which may be understood as a class of minerals of general formulation $A^{2+}B_2^{3+}O_4^{2-}$, where A and B can be divalent, trivalent or quadrivalent cations, including magnesium, zinc, iron, manganese, aluminum, chromium, titanium and silicon. A and B can also be the same metal under different charges, such as in the case $Fe_3O_4$ (as $Fe^{2+}Fe_2^{3+}O_4^{2-}$). In addition, the nanostructure composition herein may include zeolites (aluminosilicates) as well as metal-organic frameworks (MOF). A MOF may be generally understood as crystalline compounds consisting of metal ions or cluster coordinated to organic molecules to form one-, two- or three-dimensional structure that may be porous.

Attention is next directed to FIG. 1 which outlines a first general approach herein as applied to a selected nanoparticle of any one of the herein indicated nanostructure compositions. While FIG. 1 therefore illustrates nanoparticles it should be appreciated that any of the nanostructures noted herein may be utilized. Accordingly, the nanoparticles may first be charged and configured to repel one another as a function of pH adjustment in an aqueous environment. As illustrated in FIG. 1, for a given nanoparticle in an acidic environment (pH$\leq$7.0), and in particular a relatively strong acidic environment (pH$\leq$4.0) the nanoparticle will initially become positively charged. Upon treatment with an ionic surfactant providing a corresponding negative charge the positively charged surface of the nanoparticle becomes ionically associated with the surfactant such that the particles may be concentrated without irreversible aggregation. In such context, an ionic surfactant herein may be understood as any compound that ionically associates with the charged surface of the nanoparticle and stabilizes the nanostructures against the indicated tendency to aggregate. Such stabilization may be due to steric repulsion due to the relative size of the hydrophobic group on the selected ionic surfactant that is ultimately employed.

One preferred example of such surfactant includes the sodium salt of dodecylbenzene sulfonic acid (SDBS) which is specifically illustrated in FIG. 1. As can be seen, the nanoparticle in association with the SDBS may now be concentrated in the aqueous phase such that there is little or no irreversible aggregation. In addition, the aromatic ring with the attached dodecyl hydrocarbon chain clearly can provide the steric repulsion necessary to provide such non-aggregating characteristics. Reference to such irreversible aggregation may be understood as that situation where the particles would otherwise aggregate together and form a larger relatively continuous mass of material and sacrifice their nanostructure configuration. Accordingly, the nanoparticles so stabilized may now be configured to flocculate which then provides a convenient initial removal of the bulk of the water (e.g., 90% or more by weight of the water present). The remaining water may then be removed by centrifugation, again, without aggregation of the nanoparticles such that the water may be readily decanted.

Figure 2:
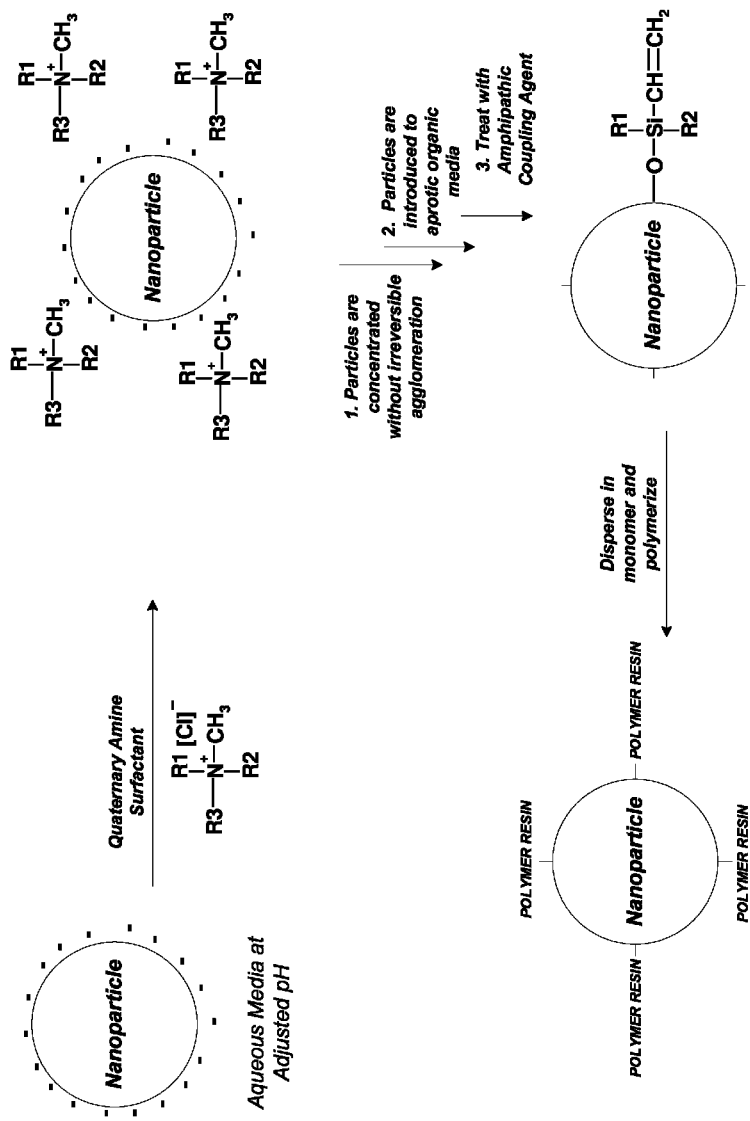
FIG. 2 illustrates pH adjustment to provide nanostructures with negative surface charge, surfactant association to prevent agglomeration, exchange into organic media, treatment with coupling agent and dispersion in a polymer network.

Attention is next directed to FIG. 2 which illustrates that situation wherein the nanoparticle is now provided in aqueous media at an adjusted pH of $\leq$7.0. Accordingly, the surface of the nanoparticles will tend to develop a relative negative charge and will again repel one another as a function of such pH adjustment. Upon treatment with an ionic surfactant providing a corresponding positive charge the nanoparticle again becomes ionically associated with the surfactant such that the particles may again be concentrated with little or no irreversible aggregation. As shown in FIG. 2, a preferred positively charged surfactant may include a quarternary ammonium salt. One particularly preferred quarternary ammonium salt is available under the tradename ADOGEN™ 464 which is methyltrialkyl($C_8$-$C_{10}$)ammonium chloride.

Accordingly, in the context of the present disclosure, the feature that there is no irreversible aggregation may be further understood as that situation wherein $\leq$5.0% by weight of the nanostructures aggregate. Therefore, the present invention applies to that situation wherein $\leq$4.0% by weight of the nanostructures aggregate, or wherein $\leq$3.0% by weight of the nanostructures aggregate, or wherein $\leq$2.0% by weight of the nanostructures aggregate, or wherein $\leq$1.0% by weight of the nanostructures aggregate, and wherein $\leq$0.1% by weight of the nanostructures aggregate. In addition, the ionic surfactant for use herein may be selected from those surfactants that posses a charged group selected from the group consisting of sulfonates, sulfate, phosphonate, phosphates, ammonium and quaternary ammonium groups.

The nanoparticles so isolated may then be introduced into an organic solvent, preferably an aprotic organic solvent. More specifically, an organic solvent such as an aromatic type organic solvent (e.g. toluene) can be added to the now recovered nanoparticles. In those situations where the solvent may form an azeotrope with water and wherein the solvent is relatively high boiling (e.g. $\geq$50° C.) the remaining water may be removed by azeotropic distillation. In addition, one may now specifically select the organic solvent to be relatively polar or non-polar to better solubilize any residual surfactant that is now to be removed from the particle surface.

Within the organic phase the nanoparticles can now disperse and be treated with a coupling agent, preferably an amphipathic coupling agent. The coupling agent may be generally understood as any compound that readily and irreversible forms covalent attachment on the surface of the nanoparticles and also provides a functional group capable of polymerization such that the nanoparticles may then become covalently bonded in a polymer resin matrix. Typically, the covalent attachment to the nanoparticle may be a condensation type reaction. The coupling agent may therefore be selected from silanes, sulfonates, sulfates, phosphonates, phosphates, quarternary amines or zircoaluminates. It should be appreciated that the coupling agent also operates herein to liberate some of the surfactant such that it may be removed by washing.

With respect to the use of silane coupling agents, such may include silanes bearing substituents selected from (1) the group consisting of 1-2 alkyl groups having 1-3 carbon atoms; (2) 1-2 alkylene groups; and (3) a substituent selected from the group consisting of chlorine, bromine and an alkoxy group having 1-3 carbon atoms. It may be appreciated that the halogen or alkoxy group may then hydrolyze to provide hydroxy (—OH) functionality. Accordingly, one preferred silane coupling agent may have the formula:

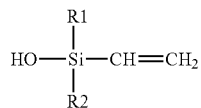

wherein R1 and R2 may comprise alkyl groups. Along such lines, the preferred silane coupling agent may specifically comprise dimethyl ethoxy vinyl silane (DMEOVS).

A sulfonate coupling agent for use herein may therefore have the following general formula:

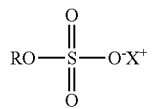

wherein R may comprise an alkenyl group and X$^+$ may comprise a metal cation. Similarly, a phosphonate coupling agent for use herein may be of the general formula:

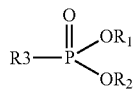

wherein R$_3$ may provide an alkenyl group and either of R$_1$ or R$_2$ may provide functionality for covalent attachment to the nanoparticle surface. For example, either of R$_1$ or R$_2$ may comprise a hydrogen to provide hydroxyl functionality capable of condensation with surface hydroxyl groups on the nanoparticle to provide ether linkages.

In addition, as noted, the coupling agent herein may comprise a zircoaluminate which may have the following general structure:

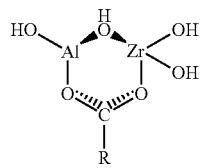

wherein R is a copolymerizable group consisting of copolymerizable alkene groups. Preferred zircoaluminates may therefore include methacryloxy zircoaluminates.

The amount of coupling agent may be about 1.0-50.0% by weight of the nanoparticles present. More preferably, the level of coupling agent may be 1.0-25.0% by weight, as well as 1.0-15.0% by weight. Such levels may then preferably promote the coupling of the nanoparticles with an ensuing monomer or polymer such that the nanoparticles are covalently attached to an organic matrix.

Furthermore, it is contemplated herein that upon introduction of the coupling agent into the organic media containing the nanoparticles, mechanical agitation may be provided via stirring, relatively high-shear mixing, ball milling, planetary milling, jet milling, impingement homogenization, and/or sonication. In such manner the nanoparticle surfaces may be made more available to coupling agent. An increase in coupling agent bound to the surface of the nanoparticle may therefore provide more homogenous distribution of the nanoparticle in the monomer and corresponding polymer network for attachment. Such increase in distribution may also lead to relatively more homogenous properties as the polymer/nanoparticle bonding is relatively more uniform and the dispersed phase of nanoparticles in the polymer resin is also more uniform and consistent through-out a particular resin network.

The organic matrix material herein may therefore preferably include polymeric resins and/or as now recited above, monomers that may be polymerized before in the presence of the nanostructured materials noted herein. Such polymer resins may preferably include vinyl based monomer [CH$_2$=C(R1)(R2)] and corresponding polymer resins which may be understood as having the repeating unit:

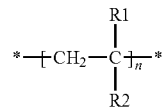

wherein R1 and R2 may be selected from hydrogen, alkyl groups, alkylene groups, aromatic groups, ester groups and/or carboxylic acid type functionality, as well as metal salts thereof, thereby providing charged ionomer type functionality. The value of n may be from 10-10,000, including all values and numerical increments therein. Accordingly, a preferred polymer may include a polyacrylate which may include the following general structure:

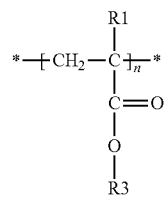

wherein R1 and n may be as defined above and R3 may be any alkyl or aromatic group.

Preferably, the monomers contemplated for use herein specifically include styrene, acrylates, methacrylates, methyl methacrylate, isobornyl methacrylate, triethyleneglycol dimethacrylate, hexanediol dimethacrylate, bisphenol-A glycidyl dimethacrylate, ethoxylated bisphenol-A glycidyl methacrylate, liquid crystalline diacrylates, liquid crystalline dimethacrylates and/or epoxide type monomers.

The polymers for use herein may also include thermoset (crosslinked) type polymers and their associated monomeric precursors such as di or triacrylates that may similarly be covalently bonded to the nanoparticles. For example, it is contemplated herein that one may utilize epoxy based polymers, an example of which may include the use the precursors of bisphenol A and epichlorohydrin to provide the epoxy based polymer (diglycidyl ethers of bisphenol A of varying molecular weights of 340-5000) which may then be crosslinked at room temperature with aliphatic amines or at elevated temperature with organic dicarboxylic acids, typically aromatic based dicarboxylic acids or acid anhydrides, such as trimellitic anhydride (TMA).

In addition, one may utilize inorganic type polymers and their associated monomeric precursors. Inorganic polymers may be understood as any polymer containing a backbone that does not include carbon. One preferred inorganic polymer herein includes siloxane based polymers, which may have the following general structure:

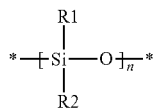

wherein R1 and R2 may be selected from alkyl groups, alkylene groups and/or aromatic groups and the value of n may be from 10-10,000, including all values and numerical increments therein. Other inorganic polymers and associated monomeric precursors contemplated herein include polysilazanes (polymer containing Si—N linkages in the main chain) as well as polysilsesquioxanes (compounds with an empirical formula $RSiO_{1.5}$ where R is either hydrogen or an alkyl, alkene, aryl or arylene group).

Furthermore, the polymers and associated monomeric precursors may extend to polymers such as polylactones such as polycaprolactone and/or polylactide, polyglycolides, and polylactide-co-glycolides.

It may now be appreciated that the level of any of the aforementioned nano structures may be present within any given monomer and/or polymer up to a level of 80% volume fraction. That is, the level of nanostructures may be up to an include 80% by volume within the polymer and/or monomer matrix. Accordingly, the level of nanostructures may be present in the range of 0.1% to 80% by volume and all values therein, in 0.1% v/v increments.

Accordingly, the present invention provides a method of exchanging nanostructures from within aqueous liquid media into organic liquid media that is direct and may consist of only the steps of (1) providing the nanostructures in liquid media; (2) adjusting the pH to provide a net ionic charge on the surface of the nanostructures, incorporate ionic surfactant to reduce nanostructure aggregation; (3) concentrating the nanostructures in the aqueous liquid media; (4) introducing an organic media to such concentrated nanostructures; and (5) introduction of a coupling agent that is capable of covalent attachment to the nanostructures along with a functional group capable of polymerization.

The present disclosure will have particular utility in various biomedical applications, namely the placement of relatively tough, strong, and durable polymer-matrix composites containing covalently bonded nanoparticles as relatively long-lasting substitutes for tooth and bone structures. In general, the present disclosure provides a convenient and relatively direct method to disperse nanostructures from aqueous media into organic media and ultimately into a polymer resin network. The nanostructure-polymer resin network may therefore be utilized in any application where a nanostructure-polymer resin composite network may be desired.

It should also be appreciated that all of the various embodiments noted herein are interchangeable and features within any of the drawings may be used within each of the respective drawings, to optimize any and all of the disclosed characteristics of the nanostructured composites noted herein. The foregoing description of several methods and embodiments has been presented for purposes of illustration. It is not intended to be exhaustive and many modifications and variations are possible in light of the above teaching.

What is claimed is:

1. A method of exchanging nanostructures from within aqueous liquid media into organic liquid media comprising:
   providing solid nanostructures in an aqueous liquid media;
   adjusting the pH of said aqueous liquid media to provide a net ionic charge on a surface of said nanostructures;
   incorporating an ionic surfactant in said aqueous liquid media wherein said level of ionic surfactant is sufficient to reduce nanostructure aggregation;
   concentrating said nanostructures in said aqueous liquid media;
   introducing organic liquid media to said concentrated nanostructures;
   introducing a coupling agent wherein said coupling agent is capable of covalent attachment to said nanostructure surface and provides a functional group capable of polymerization to covalently bond said nanostructures to a selected monomer and/or polymer resin.

2. The method of claim 1 wherein said nanostructures comprise nanoparticles, nanotubes and/or nanoplatelets.

3. The method of claim 1 wherein said nanostructures have at least one size dimension of 1 nm to 999 nm.

4. The method of claim 1 wherein said nanostructures comprise platelets with an aspect ratio of length divided by diameter of greater than or equal to 3.0.

5. The method of claim 1 wherein said solid nanostructures comprise a metal oxide selected from the group consisting of metal oxides MgO, SrO, BaO, CaO, $ZrO_2$, FeO, $V_2O_3$, $V_2O_5$, $Mn_2O_3$, $Fe_2O_3$, NiO, CuO, $Al_2O_3$, ZnO, $Ag_2O$, $TiO_2$, $ZrO_2$, $HfO_2$, $WO_2$, and mixtures thereof.

6. The method of claim 1 wherein said nanostructured solids comprise layered double hydroxides of the formula:

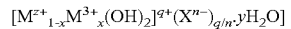

wherein x may range from 0.2 to 0.5, n can be any positive whole number, y can be zero or any positive number, q=x or q=2x−1, z=1 or z=2.

7. The method of claim 6 wherein z=2, q=x and $M^{z+}=Ca^{2+}$, $Mg^{2+}$, $Mn^{2+}$, $Fe^{2+}$, $Co^{2+}$, $Ni^{2+}$, $Cu^{2+}$ or $Zn^{2+}$.

8. The method of claim 7 wherein z=1, q=2x−1 and $M^{z+}=Li^+$ and $M^{3+}=Al^{3+}$.

9. The method of claim 1 wherein the nanostructured solids comprise one of a metal phosphates and metal phosphonates.

10. The method of claim 1 wherein the nanostructured solids comprise spinels or metal organic frameworks.

11. The method of claim 10 wherein said spinels are of the formula $A^{2+}B_2^{3+}O_4^{2-}$ wherein A and B can be divalent, trivalent or quadrivalent cations.

12. The method of claim 1 wherein said polymer resin material comprises vinyl based monomers $[CH_2=C(R1)(R2)]$ or corresponding polymers of the formula:

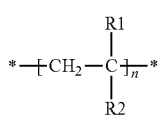

wherein R1 and R2 may be selected from hydrogen, alkyl groups, alkylene groups, aromatic groups, ester groups, carboxylic acid groups and metal salts thereof, wherein n has a value of 10-10,000.

13. The method of claim 1 wherein said polymer resin comprises inorganic polymers or their monomeric precursors.

14. The method of claim 1 wherein said polymer resin comprises monomeric precursors or polymers selected from the group consisting of polyacrylates, polysiloxanes, polysilazanes, polylactides, polyglycolides, polylactide-co-glycolide, and polycaprolactones.

15. The method of claim 1 wherein said reduction in nanostructure aggregation is such that the level of nanostructure aggregation is less than or equal to 5.0% by weight.

16. The method of claim 1 said ionic charge on said surface of the nanoparticles is either positive or negative and said ionic surfactant that reduces nanostructure aggregation displaces one of said positive or negative charge on said nanoparticle surface.

17. The method of claim 1 wherein said ionic surfactant includes chemical functionality selected from the group consisting of sulfonates, sulfate, phosphonate, phosphates, ammonium and quaternary ammonium groups.

18. The method of claim 1 wherein said coupling agent is selected from the group consisting of silanes, sulfonates, sulfates, phosphonates, phosphates, quarternary amines, zircoaluminates, and mixtures thereof.

19. The method of claim 1 wherein said nanostructured solids are present at a level up to 80% by volume in said monomer and/or polymer resin.

20. The method of claim 1 wherein said polymer resin is selected from the group consisting of styrenes, acrylates, methacrylates, methyl methacrylate, isobornyl methacrylate, triethyleneglycol dimethacrylate, hexanediol dimethacrylate, bisphenol-A glycidyl dimethacrylate, ethoxylated bisphenol-A glycidyl methacrylate, liquid crystalline diacrylates, liquid crystalline dimethacrylates, epoxies, and mixtures thereof.

21. A method of exchanging nanostructures from within aqueous liquid media into organic liquid media comprising:
providing solid nanostructures containing metal oxides or layered double hydroxides in an aqueous liquid media wherein said nanostructures have at least one size dimension of 1 nm to 999 nm;
adjusting the pH of said aqueous liquid media to provide a net ionic charge on a surface of said nanostructures;
incorporating an ionic surfactant in said aqueous liquid media wherein said level of ionic surfactant is sufficient to reduce nanostructure aggregation to a level of less than or equal to 5.0% by weight;
concentrating said nanostructures in said aqueous liquid media;
introducing organic liquid media to said concentrated nanostructures;
introducing a coupling agent wherein said coupling agent is capable of covalent attachment to said nanostructure surface and provides a functional group capable of polymerization to covalently bond said nanostructures to a selected monomer and/or polymer resin wherein said nanostructures are present in said monomer and/or polymer at a level of 0.1% to 80% by weight.

* * * * *